US007065433B2

(12) United States Patent
Basu et al.

(10) Patent No.: US 7,065,433 B2
(45) Date of Patent: Jun. 20, 2006

(54) VEHICLE MONITORING AND REPORTING SYSTEM AND METHOD

(75) Inventors: Sabyasachi Basu, Redmond, WA (US); William R. Frans, Seattle, WA (US); R. Eugene Iverson, Seattle, WA (US); John B. Maggiore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/360,295

(22) Filed: Feb. 7, 2003

(65) Prior Publication Data

US 2004/0158367 A1 Aug. 12, 2004

(51) Int. Cl.
*G06F 7/00* (2006.01)

(52) U.S. Cl. ........................................................ 701/29

(58) Field of Classification Search ................ 701/8–9, 701/24, 29–36, 117, 119–120; 340/425.5, 340/438, 439, 945, 961
See application file for complete search history.

(56) References Cited

U.S. PATENT DOCUMENTS

| | | | | |
|---|---|---|---|---|
| 4,943,919 | A | 7/1990 | Aslin et al. | |
| 5,522,026 | A | 5/1996 | Records et al. | |
| 5,974,349 | A | 10/1999 | Levine | |
| 6,043,757 | A | 3/2000 | Patrick | |
| 6,198,996 | B1 | 3/2001 | Berstis | |
| 6,219,626 | B1 * | 4/2001 | Steinmetz et al. | 702/183 |
| 6,292,724 | B1 | 9/2001 | Apsell et al. | |
| 6,338,152 | B1 * | 1/2002 | Fera et al. | 714/48 |
| 6,434,512 | B1 | 8/2002 | Discenzo | |
| 6,442,459 | B1 | 8/2002 | Sinex | |
| 6,459,969 | B1 * | 10/2002 | Bates et al. | 701/29 |
| 6,553,290 | B1 | 4/2003 | Pillar | |
| 6,631,384 | B1 * | 10/2003 | Richman et al. | 707/104.1 |
| 2001/0033225 | A1 | 10/2001 | Razavi et al. | |
| 2002/0065698 | A1 | 5/2002 | Schick et al. | |
| 2002/0143443 | A1 | 10/2002 | Betters et al. | |
| 2002/0143445 | A1 | 10/2002 | Sinex | |
| 2002/0163427 | A1 | 11/2002 | Eryurek et al. | |

FOREIGN PATENT DOCUMENTS

| | | |
|---|---|---|
| WO | WO 99/45519 | 9/1999 |
| WO | WO 02/17184 | 2/2002 |

OTHER PUBLICATIONS

Copy of Search Report for corresponding European Application EP 04 07 5212 dated Nov. 21, 2005.

* cited by examiner

*Primary Examiner*—Thu V. Nguyen
(74) *Attorney, Agent, or Firm*—Alston & Bird LLP

(57) ABSTRACT

The system and associated method for monitoring a vehicle receives data, which may be fault data and/or prognostic data, associated with operation of the vehicle, such as via a data gathering element. In addition, at least one user preference is applied to the data, such as via a customization element, and at least a portion of the data is presented, such as via a display element. The user preference(s) may be an alerting preference, which includes alerting the user one the data reaches a predetermined threshold, a prioritization preference, which includes prioritizing the data based upon historical data, and/or a data delivery preference, which includes delivering the data to one or more locations.

44 Claims, 5 Drawing Sheets

VEHICLE MONITORING AND REPORTING SYSTEM AND METHOD

BACKGROUND OF THE INVENTION

The present invention relates to the automated monitoring and reporting of vehicle performance data while incorporating user preferences regarding the manner in which the data is prioritized and presented to the user. In particular, the systems and methods of the present invention combine real-time performance data gathered by a performance monitoring system for a vehicle with certain user preferences, such that each user can customize the system to report to and/or alert the user of certain types of performance data in a desired manner and/or at a desired time.

Vehicles, particularly commercial air, marine and land vehicles, typically include some type of performance monitoring system that records data regarding the vehicle performance, which includes the performance of the various components of the vehicle. The data includes a record of certain performance events that occur during the operation of the vehicle. The performance monitoring system typically conducts data collection and reports all of the data collected to the user. The user then may utilize the data in determining the type of maintenance, if any, that the vehicle may need. For example, if the data indicates that a particular component of the vehicle is malfunctioning or that the performance of one or more components may contribute to a vehicle failure in the future, then the user can perform the appropriate maintenance on the vehicle at the next opportunity.

For example, an air vehicle typically has a central maintenance computer (CMC) and/or an aircraft condition monitoring system (ACMS). The central maintenance computer collects, consolidates and reports performance data for the components of the air vehicle. Certain maintenance messages are associated with one or more types of performance data, and are stored in the CMC. Thus, when the CMC receives performance data, it analyzes the data to determine if the received data meets the criteria associated with the maintenance messages. If the received data meets the criteria, then the CMC presents the appropriate stored maintenance message to the user via a user interface. A CMC is further described, for example, in U.S. Pat. No. 4,943,919 entitled, "Central Maintenance Computer System and Fault Data Handling Method."

Similar to the CMC, an ACMS also collects, monitors, records and reports real-time aircraft system data. For example, the data collected by the ACMS is used to perform cabin pressure and temperature monitoring, hard landing detection, flight crew monitoring, and engine monitoring in addition to many other aircraft performance functions. The reported data is then utilized to analyze aircraft performance and trends in aircraft performance, report significant flight events, and troubleshoot faults.

While the current system(s) utilized for vehicle performance monitoring provide the necessary data for a user to make an appropriate maintenance decision, it is still necessary for a user to sort through all of the data and maintenance messages to determine what type of maintenance is necessary. Thus, the user must sort and interpret the data provided by the monitoring system, such as the CMC and/or ACMS for an air vehicle, in light of the user's knowledge of the particular maintenance plan for the vehicle. For example, one user may implement a conservative maintenance plan for its vehicles, and as such, that user may carry out a certain type of maintenance the first time a particular performance event occurs during the operation of the vehicle. Another user, however, may wish to carry out a certain type of maintenance only if a particular performance event occurs more than five times during the operation of the vehicle.

With the current monitoring systems, each user will be presented with the same performance data, and the user must interpret it in light of their preferred maintenance plan, which is time consuming and dependent upon the user being familiar with the appropriate maintenance plan and any recent changes to the maintenance plan. For many types of vehicles, particularly commercial vehicles, the amount of time the vehicle is out of service is costly to the vehicle owner. As such, the longer it takes for a user to determine the type of maintenance that is necessary for a vehicle in accordance with the particular maintenance plan for the vehicle, the longer the vehicle will be out of service, which may be expensive to the vehicle owner if the vehicle would otherwise be in service.

Other monitoring systems include certain user customizable settings. For instance, some systems permit a user to specify alarm filtering and prioritization, and general alarm level triggers and thresholds. Thus, the data presented to the user will be associated with an alarm only if the data meets the criteria specified by the system. One example of such a system is disclosed in published application 2002/0163427 to Eryurek et al., which was published on Nov. 7, 2002. Further systems permit management of maintenance tasks based upon operational and scheduling preferences, such that the intervals between maintenance tasks may be increased or the tasks may be organized into groups. Examples of these systems are described in U.S. Pat. No. 6,442,459 to Sinex and published application 2002/0143445 to Sinex, which published on Oct. 3, 2002. While these systems permit users to customize a performance monitoring system to some extent, they do not provide for the level of customization that is necessary to allow a user to implement a particular maintenance program based upon the user preferences. As such, although a user may be permitted to specify when and how alarms associated with the data are presented and/or when and how the user is notified of certain maintenance tasks in general, the systems do not allow a user to specify how the system interprets and presents particular type(s) of data. For example, the conventional monitoring systems would not permit a user to specify the number of times a particular performance event must occur during the operation of the vehicle before the user is notified that a particular type of maintenance is recommended.

As such, there is a need for a vehicle monitoring and reporting system that combines real-time vehicle performance data with specific user preferences for different types of data that may be potentially captured by the system, such that a user may implement a maintenance plan that fits their specific business plan for their vehicles.

BRIEF SUMMARY OF THE INVENTION

The system and associated method for monitoring a vehicle of the present invention permits a user to implement a maintenance plan that fits a specific business plan for their vehicles by combing real-time vehicle performance data with specific user preferences for each potential type of data that is captured by the system. The system and associated method therefore save time and costs that are normally associated with a user interpreting all of the data provided by a vehicle monitoring system in light of a preferred maintenance plan, which is time consuming and dependent upon the user being familiar with the appropriate maintenance plan and any recent changes to the maintenance plan.

The system and associated method for monitoring a vehicle made of a plurality of components includes receiving data, which may be fault data and/or prognostic data, associated with operation of the vehicle, such as via a data gathering element. In addition, at least one user preference is applied to the data, such as via a customization element, and at least a portion of the data is presented, such as via a display element. The data gathering element may be located within the vehicle and the customization element may be located outside the vehicle, with a communication link between the two elements to transmit data between the data gathering element and the customization element. In other embodiments, the data gathering element may be located outside the vehicle, and a communication link between the data gathering element and the vehicle may be utilized to transmit data between the vehicle and the data gathering element. In further embodiments, the data gathering element and the customization element may be integrated.

The at least one user preference may be: (1) an alerting preference, which includes alerting the user once the data reaches' a predetermined threshold, (2) a prioritization preference, which includes prioritizing the data based upon historical data related to the vehicle and/or the type of vehicle, and/or (3) a data delivery preference, which includes delivering one type of data to the user and another type of data elsewhere to another location for further analysis. The data delivery preferences may also include directions to deliver data to the user via the desired type of display element, such as a pager, an electronic mail display device, and/or a terminal.

In some embodiments of the system and method, the data may represent events associated with operation of the vehicle, and an alerting preference may be applied to alert the user once the data reflects that a maximum number of events have occurred. The data also may be consolidated and the probability of vehicle failure from the occurrence of an event over time may be determined, such as by a processing element. In addition, a prioritization preference may be applied to prioritize the data based upon a probability of vehicle failure after the occurrence of an event, where data associated with a higher probability of vehicle failure has a higher priority than data associated with a lower probability of vehicle failure. Prioritization preferences also may include directions for presenting data based upon the priority of the data. In this embodiment, the alerting preferences may include directions to alert the user, and the data delivery preferences may include directions to immediately deliver the data to the user when the probability of vehicle failure after the occurrence of an event in the data is at least a predetermined value. At least one predetermined value for the probability of failure of the vehicle following at least one event therefore may be stored, such as in a storage element. A user-defined status may also be assigned to data associated with an event based upon the probability of failure of the vehicle following the event, such as via the customization element.

The data regarding the operation of the vehicle also may be integrated with other data associated with at least one of a design of the vehicle, a maintenance history of the vehicle, a maintenance supply list for the vehicle, and an aggregate performance for the type of vehicle, such as via the data gathering element. In addition, at least a portion of the integrated data may be presented, such as via the display element.

Thus, the system and method for monitoring a vehicle provide techniques for not only gathering and displaying data associated with the operation of the vehicle, but also for applying user preferences to the data that permit the user to determine when to be alerted of certain data, how to prioritize the data based upon historical data for the vehicle, and how the data is to be delivered to the user and/or other data analysts. Thus, the user can set the preferences to automatically implement a specific maintenance plan for the vehicle, which is much less costly and time-consuming than the conventional techniques of physically interpreting the vehicle performance data in light of a desired maintenance plan to determine what type of maintenance is needed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
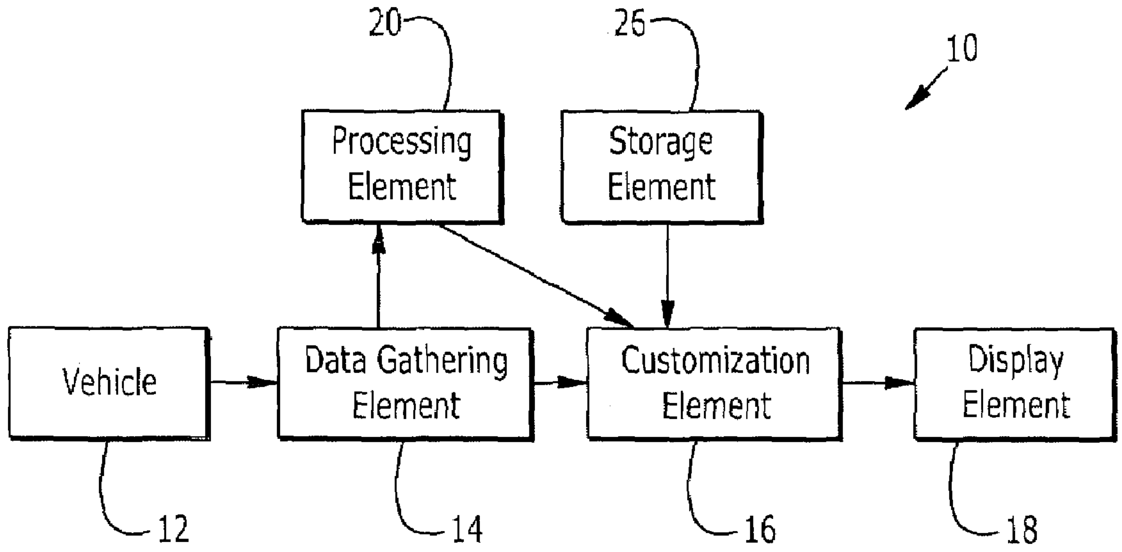
FIG. 1 illustrates a block diagram of the vehicle monitoring system, according to one embodiment of the present invention.

As shown in FIG. 1, the vehicle monitoring system 10 of the present invention includes at least a data gathering element 14, a customization element 16 and a display element 18. The vehicle monitoring system may monitor the operations of any type of vehicle 12, such as air, marine and land vehicles or the like, which includes monitoring the operation of the vehicle as a whole and/or the various components of the vehicle. Thus, the data gathering element 14 may be any type of system or device capable of receiving data associated with the operation and performance of the vehicle 12 and may vary as will be recognized by those skilled in the art depending upon the type of vehicle and/or the component(s) of the vehicle being monitored. For example, in some embodiments of the present invention, the data gathering element 14 may be a central maintenance computer (CMC) and/or an aircraft condition monitoring system (ACMS). As described above, a CMC and an ACMS monitor, collect, consolidate and report performance data for the components of the air vehicle. As such, the CMC and/or ACMS provide the necessary vehicle performance data that is utilized and further analyzed in the system 10.

The data includes any type of performance-related data regarding the overall operation of the vehicle 12 or any component or combination of components of the vehicle. The data may include information regarding a fault experienced by the vehicle or any component or combination of components of the vehicle. In addition, the data may include prognostic information regarding the vehicle or any component or combination of components of the vehicle that may be used to indicate whether a fault is likely. In particular, the data generally includes a record of certain performance events that occur during the operation of the vehicle. For example, a performance event may be a failure of a component or a portion of a component, which may affect the performance of the vehicle either immediately or eventually.

The data gathering element 14 may also receive other types of data that may be integrated with the performance data. For example, data associated with the design of the vehicle, a maintenance history of the vehicle, a maintenance supply list for the vehicle and/or an aggregate performance for the type of vehicle may be received by the data gathering element 14 and integrated with the vehicle performance data that is collected by the data gathering element. This additional data may be provided in various manners, including being originally provided by the manufacturer of the vehicle and then updated by the maintenance personnel.

Once the data is collected, the data gathering element 14 makes the data available to the customization element 16. For instance, the data gathering element 14 may transmit the data to the customization element 16 or the customization element 16 may access the data from the data gathering element 14. Thus, the data gathering element and the customization element may be located within the vehicle or outside the vehicle. For instance, the data gathering element 14 may be located within the vehicle while the customization element 16 is located outside the vehicle, and there may be a communication link between the elements for the data to travel between the elements. In other embodiments of the system 10, the data gathering element 14 may include the customization element 16, such that a communication link between the elements is not necessary. In embodiments in which the data gathering element 14 is located outside the vehicle, a communication link between the vehicle and the data gathering element 14 enables the transmission of data between the vehicle and the data gathering element. The communications link(s) described above may be any type of communication link known to those skilled in the art, such as any type of wireless or wired wide-area or local area communication network connection. In addition the data gathering element 14 and/or the customization element 16 may include a storage element for storing any of the data collected by and/or utilized by the system 10.

Figure 2:
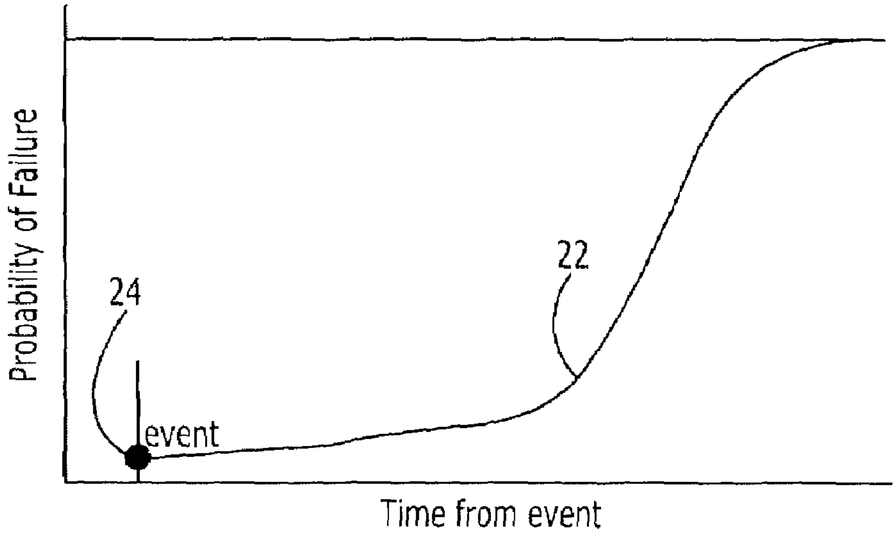
FIG. 2 illustrates a graph of the probability of failure of a vehicle after the occurrence of a vehicle performance event, generated in accordance with one embodiment of the present invention.

In some embodiments of the system 10, the gathered data may also be utilized to determine a probability of failure of the vehicle over time after the occurrence of a performance event. Thus, the vehicle monitoring system may include a processing element 20 to analyze the gathered vehicle operation data in light of historical data or simulated data, such as empirical and/or theoretical information, regarding the performance of the vehicle or similar vehicles under similar conditions to determine the probability of vehicle failure as the time from the occurrence of the event increases. Historical data may be gathered over time by monitoring the vehicle during each vehicle operation. Thus, the data may be updated continuously during or after each vehicle operation. In some embodiments of the system 10, the processing element 20 may be included in the customization element 16, or the processing element may be separate from and in communication with the customization element 16. FIG. 2 illustrates one embodiment of a failure probability curve 22 that illustrates the probability the vehicle will fail after the occurrence of an event 24. Thus, the horizontal axis represents time and the vertical axis represents the probability value. For instance, the curve 22 of FIG. 2 illustrates that the probability of vehicle failure after event 24 increases as the amount of time from the occurrence of the event increases.

Figure 3:
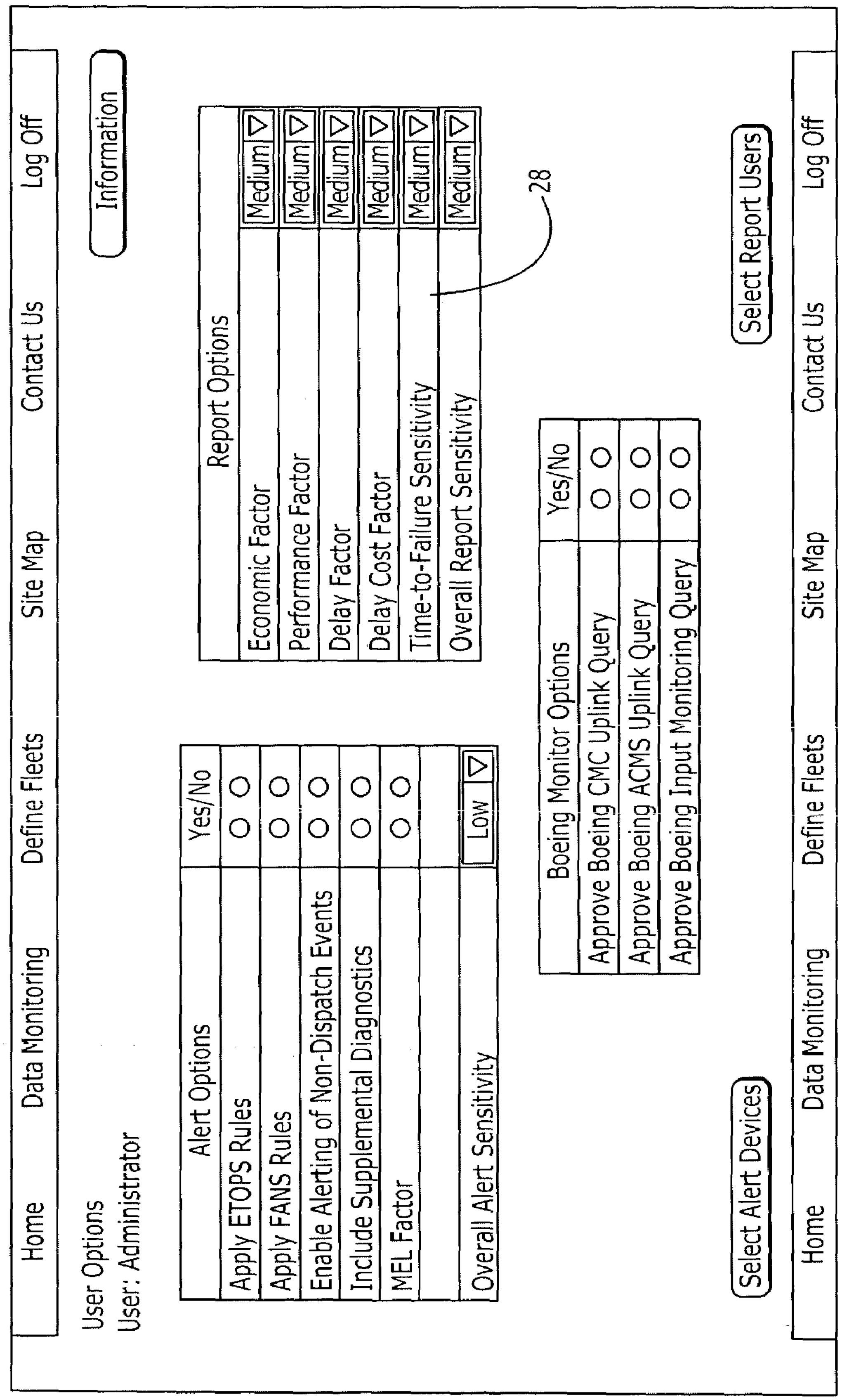
FIG. 3 illustrates a user interface permitting a user to select certain options to customize the vehicle monitoring system, according to one embodiment of the present invention.

The customization element 16 includes a storage device for storing user preferences and applying the user preferences to the data. The customization element may be embodied as software or hardware that includes the directions necessary to carrying out the desired customization based upon the user preferences. Thus, the customization element 16 includes user preferences, such as alerting preferences, prioritization preferences, and data delivery preferences. Any other type of user preferences that may be desirable for a particular application of the system 10 may also be stored in and applied by the customization element 16. A user may select the desired preferences via any type of user interface to the customization element 16. For example, the customization element may be part of or in communication with a processing element having a user interface, such as a personal computer, personal data assistant or the like having an associated display, as known to those skilled in the art. The user interface may then permit the user to choose certain settings for the options included in the user preferences. FIG. 3 illustrates one embodiment of a user interface that permits a user to select yes or no for certain user preference options to activate or deactivate the associated option, respectively. In addition, the user may select a particular level for other options shown in FIG. 3. In other embodiments, the user interface may permit the user to enter preference information via a keyboard or other data entry device, or in any other manner known to those skilled in the art. By analyzing the data and alerting or otherwise notifying the user of the data in accordance with the user preferences, the user preferences supply the directions necessary to analyze and present the data in the manner that the user desires. The user interface also permits the user to change any of the user preferences at any time the user desires.

The alerting preferences include options for the user to select in order to supply directions to the system 10 to alert the user once the data reaches one or more predetermined thresholds. Thus, the alerting preferences may include options that permit a user to select the type of data and a threshold value associated with that particular type of data, such that when the data reaches or passes the threshold value, then the system 10 will be directed to alert the user of the particular data. For example, the alerting preferences may include options that permit a user to select the maximum number of times a particular type of performance event may occur in the data before alerting the user of the performance event(s). Specifically, a user may not want to be alerted of a particular performance event unless the performance event has occurred during three separate operations of the vehicle. In some embodiments of the system 10, the user may specify whether the events must occur in consecutive operations of the vehicle, over a certain number of vehicle operations, or over a predetermined period of time that the vehicle is in operation. Permitting the user select the number of times an event may occur before alerting the user of the event reduces the probability that the user will be alerted of an event caused by a false reading or some other type of error. Thus, the system 10 saves time and money for a user who would otherwise have to investigate each event or manually determine how many times the event has occurred from previous performance data.

Furthermore, in embodiments of the system 10 that determine the probability of failure of the vehicle after the occurrence of a particular performance event, the alerting preferences may include options that permit a user to select a probability value above which the user will be alerted to the probability of failure and to the associated data. For example, a user may determine that he wants to be alerted anytime the probability of vehicle failure is more than 30%. Thus, the system 10 may include a storage element 26 in which predetermined values, such as the maximum number of times a particular type of performance event may occur, the probability value above which the user will be alerted, and any other type of threshold value are stored. In certain embodiments, the storage element 26 may be part of the customization element 16, or the storage element 16 may be separate from, but in communication with, the customization element 16, in any manner known to those skilled in the art.

The prioritization preferences include options for the user to select in order to supply directions to the system 10 to prioritize the data based upon actual, empirical and/or simulated historical data related to the particular vehicle or the type of vehicle. Thus, data, such as the occurrence of a performance event, that indicates a greater probability of vehicle failure has a higher priority than data that indicates a lower probability of vehicle failure. The prioritization preferences may also include options that supply directions to display the data via the display element based upon the priority of the data. For example, data that indicates a 60% probability of vehicle failure may be presented to the user before or in a more prominent manner than data that indicates a 50% probability of vehicle failure.

The data delivery preferences include options for the user to select in order to supply directions to the system 10 regarding the delivery of the data to the user, if at all. For example, the user's selection of options within the delivery preferences may supply directions to deliver one type of data to the user and another type of data to another location for further analysis. Thus, if the data clearly indicates a probability of failure of the vehicle that meets the requirements of the alerting preferences, as described above, then the data may be directly delivered to the user. If, however, the data is unclear or if the data does not meet the requirements for automatic delivery to the user, then the data may be delivered to another location, such as a location where further analysis may be performed on the data by an analyst or by another type of software or hardware. In one embodiment of the system 10, analysts may manually review the data delivered to the other location to determine if any of the data warrants alerting the user. If the analyst determines the data should be delivered to the user, then the analyst may manually construct a report, which the analyst transmits, manually, electronically or otherwise, to the user. The data delivery preferences also may include options to supply directions regarding where, i.e., the particular display element 18 as described below, to deliver the data and/or a message indicating that the user may access the data.

The display element 18 may be any type of element capable of displaying data that is to be reported to the user. For instance, the display element may be a pager, an electronic mail display device, a terminal or any other type of device that includes some type of screen or indication means to alert a user of data. The display element may automatically display the data or the display element may display an indication that the data is ready to be reviewed, such that the user knows to subsequently access the data. For example, if the display element is a pager, the pager may have a screen large enough to display the data or a message may be displayed that indicates to the user that the data may be accessed at another location, such as via the Internet, an intranet, or in an electronic mail message. In other embodiments, an alert may be sent to the user via electronic mail, and the electronic mail may contain the data or it may contain a message indicating that the data may be accessed at another location or containing a link to the other location, such as a site on the Internet or an intranet. Thus, the data delivery preferences may include options to supply directions to the system 10 regarding the display element(s) 18 for displaying the data and/or a message indicating the data may be accessed.

The customization element 16 is also capable of receiving and assigning a user-defined status to data associated with an event based upon the probability of vehicle failure for the event, determined as described above based upon historical information as illustrated, for example, in FIG. 2. As such, the data is reported to the user along with the status of the data, which permits the user to immediately identify the data that is the most critical in light of the user's particular requirements. The status of the data may be represented as a color or any other type of indicator assigned to the data. For example, as shown in FIGS. 4A–4C, a green, yellow or red status may be assigned to the data depending upon the probability of vehicle failure that is associated with the data, with red representing the most critical data (data indicative of the most likely probability of failure), green the least critical data (data indicative of the least likely probability of failure), and yellow the cautionary data (data indicative of a moderate probability of failure).

Figure 4A:
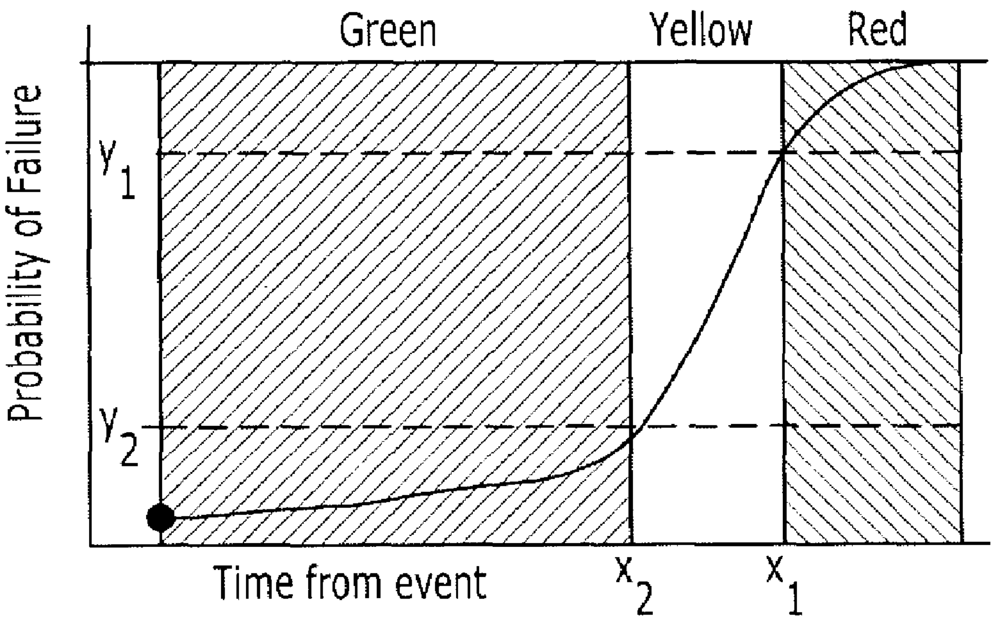
FIGS. 4A–4C illustrate the assignment of a status to the data depending upon the value of the probability of vehicle failure that is associated with the data, according to one embodiment of the present invention.

In FIG. 4A, a red status is assigned to any data associated with a probability of vehicle failure that is Y1 or greater, a yellow status is assigned to any data associated with a probability of vehicle failure that is Y2 or greater, and a green status is assigned to any other data. In FIG. 4B, a red status is assigned to any data associated with a probability of vehicle failure that is Y3 or greater, a yellow status is assigned to any data associated with a probability of vehicle failure that is Y4 or greater, and a green status is assigned to any other data. Similarly, in FIG. 4C, a red status is assigned to any data associated with a probability of vehicle failure that is Y5 or greater, a yellow status is assigned to any data associated with a probability of vehicle failure that is Y6 or greater, and a green status is assigned to any other data.

Figure 4B:
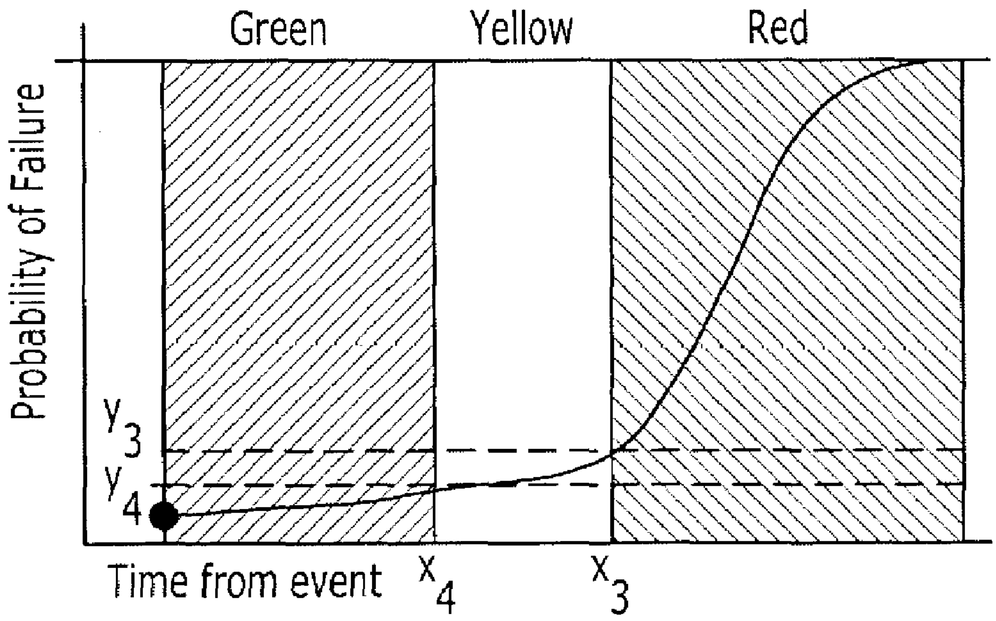

Thus, to be assigned a red or yellow status, the probability of vehicle failure associated with data analyzed by a system 10 that assigns a status to data according to the FIG. 4A representation must be greater than the probability of vehicle failure associated with data analyzed by a system 10 that assigns a status to data according to the FIG. 4B representation because Y1 is greater than Y3 and Y2 is greater than Y4, respectively. Similarly, to be assigned a red or yellow status, the probability of vehicle failure associated with data analyzed by a system 10 that assigns a status to data according to the FIG. 4B representation must be greater than the probability of vehicle failure associated with data analyzed by a system 10 that assigns a status to data according to the FIG. 4C representation because Y3 is greater than Y5 and Y4 is greater than Y6, respectively. Because the probability of vehicle failure increases as the time from the event increases, the system 10 not only analyzes the data at the time of data collection, but also repeatedly thereafter to ensure that appropriate status is assigned to the data and that the user is notified of the data when the user has specified via the user preferences.

Figure 4C:
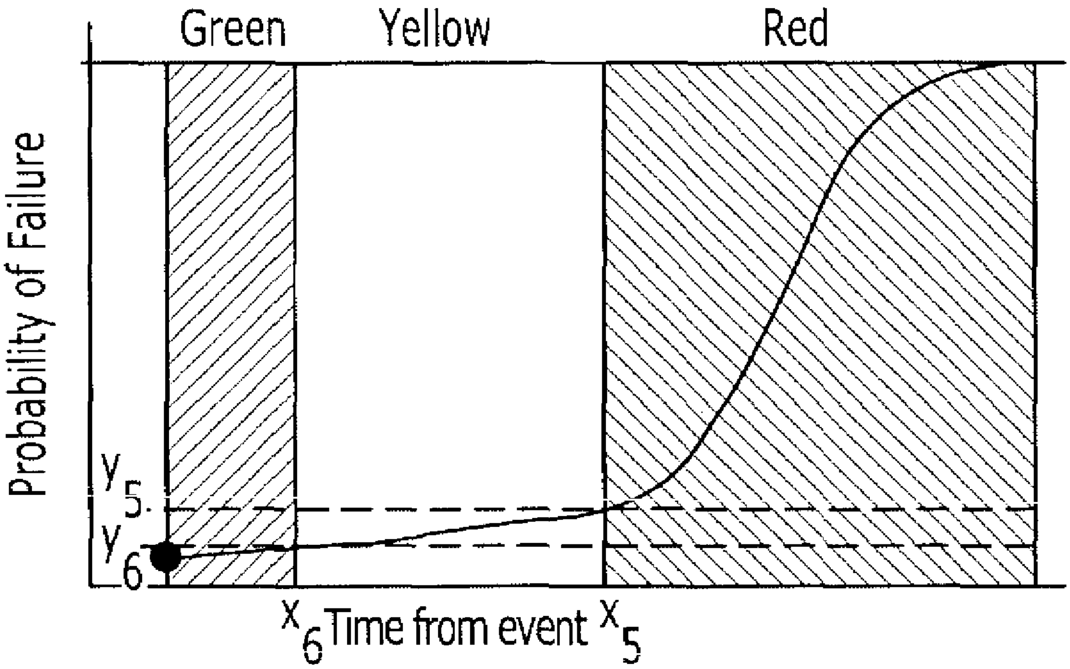

Thus, if a user relies upon the status assigned to data to determine the type of action to take regarding the vehicle, if any, the FIG. 4A representation is relatively more risky than the FIG. 4B or 4C representations because the probability of vehicle failure must be higher before a red or yellow status is assigned to the data. Likewise, FIG. 4C represents a relatively conservative approach because the probability of vehicle failure is relatively low even when a red or yellow status is assigned to the data. FIG. 4B therefore represents a moderate approach as compared to the status representations of FIGS. 4A and 4C.

As shown in FIG. 3, a user may have the option of selecting a "Time-to-Failure Sensitivity" 28 via the user interface to the system 10. In the embodiment of FIG. 3, the user may select "high," "medium," or "low" sensitivity. For instance, a "high" sensitivity may correlate to a relatively conservative status assignment, such as that illustrated in FIG. 4C, while a "low" sensitivity may correlate to a relatively risky status assignment, such as that illustrated in FIG. 4A. In other embodiments of the system 10, a user may be permitted to select the actual probability values that serve as thresholds for the status assigned to the data. For example, a user may select a 70% vehicle failure probability as the threshold to assign a red status to the data, and a 30% vehicle failure probability as the threshold to assign a yellow status to the data. Although, the status designations are described in terms of colors for the purpose of our examples, the status may take the form of any other designation known to those skilled in the art, such as any type of symbol or words that indicate the relative status of the data.

The options provided to the user via the customization element 16 of the system 10 therefore provide a user with the ability to define the manner in which data regarding the operation of a vehicle is presented to the user. As such, each user may implement a different vehicle maintenance plan based upon the particular user's selections of the options provided by the system 10. By permitting users to select their desired options, the system 10 prioritizes the data and provides the data to the user in a manner that is most efficient for the user to carry out the types of maintenance that are considered most critical to the particular user. The system 10 therefore reduces the time and expense that is typically involved in physically interpreting and analyzing the data provided by a conventional vehicle monitoring system in light of a particular maintenance plan to determine the appropriate type of maintenance.

Figure 5:
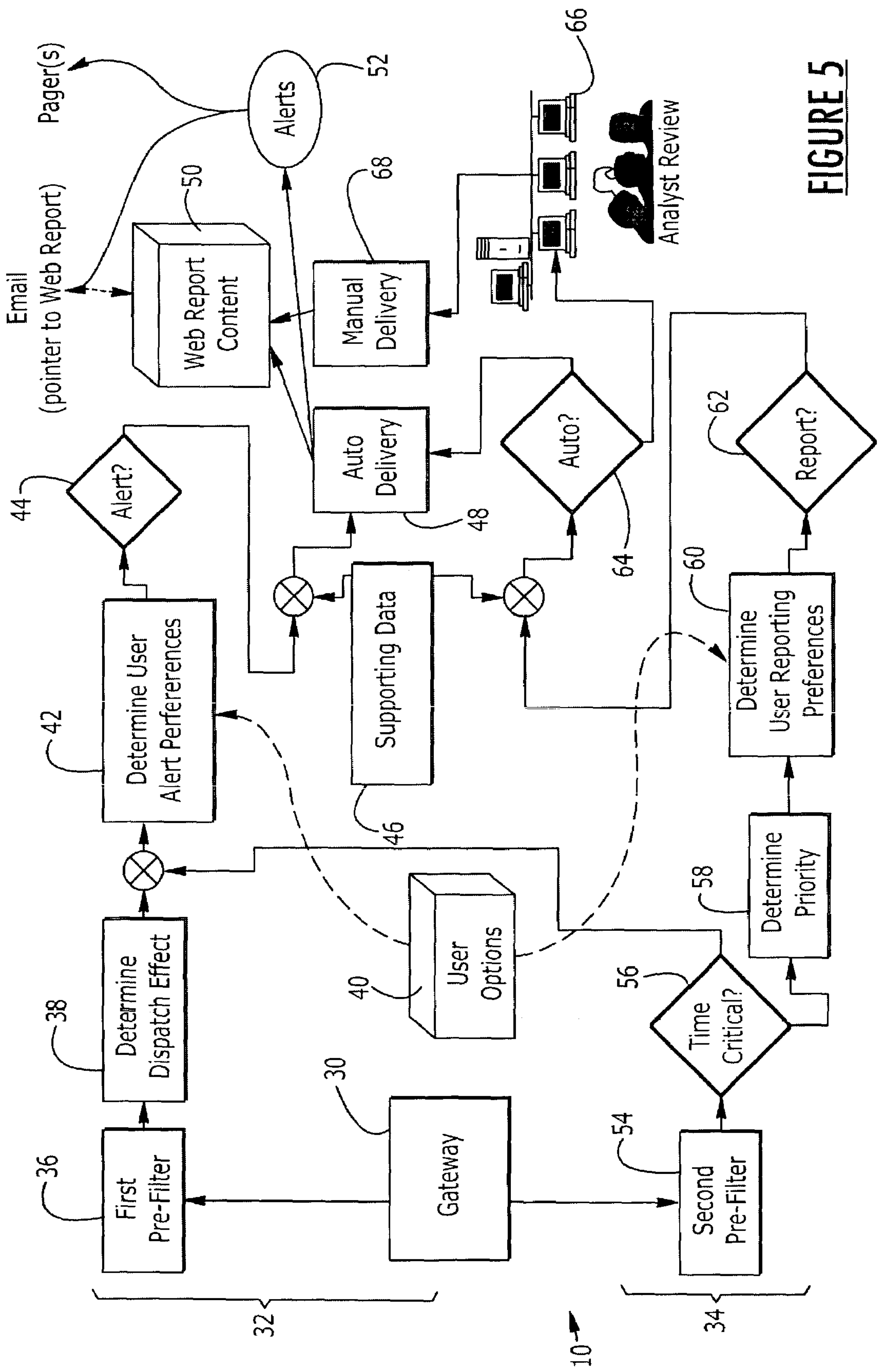
FIG. 5 illustrates a block diagram of an operational implementation of the vehicle monitoring system, according to one embodiment of the present invention.

FIG. 5 illustrates one embodiment of an operational implementation of the system 10. The functions described in the blocks of FIG. 5 may be implemented via the processing element 20 in light of the data and/or instructions provided by the data gathering element 14 and the customization element 16, and with output to the display element 18. The system 10 of FIGS. 1 and 5 may therefore be implement by any type of computing element, as known to those skilled in the art.

Data regarding the operation of a vehicle may enter the system 10 through the gateway 30. As described above, the data may be provided by a central maintenance computer (CMC) and/or an aircraft condition monitoring system (ACMS) and the data includes a record of certain performance events that occur during the operation of the vehicle. The gateway may be any type of data gateway known to those skilled in the art, such as an Aircraft Communications Addressing and Reporting System (ACARS) data gateway. The data then routed in at least two directions for further analysis by the system 10. In the first direction 32 the system determines to which portions, if any, of the data the user should be immediately alerted, while in the second direction 34, the system determines which portions of the data to report to the user, and how to report that information to the user.

Regarding the first direction 32, the data is transmitted to a first pre-filter 36 where the performance events included in the data are compared against a database of events, if any, that should be filtered out of the data, as desired for a particular type of vehicle or by a particular user. Thus, if any of the performance events in the data match the events included in the database, those performance events are filtered out of the data. For example, if, for a given vehicle operational condition, a particular performance event is known to occur, but not to provide useful feedback for the user, then that performance event may be filtered out of the data. The data may then be transmitted to a dispatch effect element 38, where the data is checked against information that may influence the dispatch of the data. For example, the data may be checked against a customer's minimum equipment list (MEL) to determine the degree to which the data will impact future vehicle dispatch. The data may also be checked against a customer's MEL to assign a priority to the event based upon known costs associated with the event. The user options 40, such as those illustrated in the user interface of FIG. 3 and described above regarding the customization element 16, may be determined, as represented by box 42.

The data is then compared to the requirements and preferences set by the user at alert gate 44 to determine whether the user desires to be alerted to any of the data. If at least some of the data meets the user's alert requirements, then that data may be integrated with supporting data represented by box 46. Examples of supporting data include any type of maintenance documentation, such as a fault isolation manual or a vehicle maintenance manual, vehicle operation information, spare parts recommendation, spare parts availability, spare parts procurement information, or any other type of data that would be beneficial to present to the user with the alert data.

The alert data and any supporting data is then automatically delivered to the user in the manner selected by the user, as discussed above and as represented by box 48. Thus, the alert data may be sent directly to a report for presentation to the user, such as a web-based report that the user may access via a network, such as the Internet or an intranet, as discussed above and as represented by box 50. In addition an alert indication may be sent to the user in any manner and via any type of device known to those skilled in the art, such as via a pager, electronic mail, cellular phone or the like, as discussed above and as represented by box 52.

Regarding the second direction 34, the data is transmitted to a second pre-filter 54 where, similar to the first pre-filter 36, the performance events included in the data are compared against a database of events that should be filtered out of the data, as desired for a particular type of vehicle or by a particular user. The second pre-filter 54 is also capable of filtering out events in the data that have not occurred a minimum number of times, which may be defined by the user, as described above. The system 10 then determines if the filtered data is time-critical, as represented by decision block 56. Thus, the data is compared to a database of events that are to be considered time-critical and escalated to alert level, as required by the user preferences. The events listed in the database are typically those of a time-critical nature, such that if the cause of the event is not addressed relatively soon, then the performance of the vehicle may be adversely affected. If any of the events in the data match the events listed in the database, then that data is combined with the alert data prior to determining the user's alert preferences, as represented by box 42, as shown in the embodiment of FIG. 5. The priority of the remaining data then may be determined, as represented by block 58. Thus, as described above, the probability of vehicle failure after the occurrence of the event(s) contained in the data is determined utilizing actual, simulated, and/or empirical historical data for the vehicle and/or the type of vehicle. See, for example, FIG. 2. The priority of the event(s) contained in the data is then determined based upon the relative probability of vehicle failure after the occurrence of the event(s). Other factors may also be considered in determining the priority of the events. For example, any type of economic, performance, repair cost, or other type of consideration may be included.

The user options 40, such as those illustrated in the user interface of FIG. 3 and described above regarding the customization element 16, may be determined, as represented by box 60. Thus, the data may also be assigned a status at this point, such as based upon the user's selection of time-to-failure sensitivity, as described above and with examples of different status assignments illustrated in FIGS. 4A–C. The data is then compared to the requirements set by the user at report gate 62 to determine whether the user desires a report of any of the data. If at least some of the data meets the user's report requirements, then that data may be integrated with supporting data, as represented by box 46. Examples of supporting data include any type of maintenance documentation, such as a fault isolation manual or a vehicle maintenance manual, vehicle operation information, spare parts recommendation, spare parts availability, spare parts procurement information, or any other type of data that would be beneficial to present to the user with the report data.

The system 10 then determines whether to automatically deliver the report data to the user in the manner selected by the user, as discussed above and as represented by box 64. If the report data is to be automatically transmitted to the user, then the report data may be sent directly to a report for presentation to the user, such as a web-based report that the user may access via a network, such as the Internet or an intranet, as discussed above and as represented by box 50. If the user has identified any type of the report data that should not be automatically transmitted to the user, then the system 10 determines whether to transmit that data to a remote location for analysts 66 to manually review. If the data meets the user-defined requirements for analyst review, then the data is transmitted to the analysts 66. If the analysts 66 determine that any of the data should be reported to the user, then the analysts may manually deliver, as represented by box 68, that data to a report for presentation to the user, such as a web-based report that the user may access via a network, such as the Internet or an intranet, as discussed above and as represented by box 50. In other embodiments of the system 10, the report data may also be transmitted to the user in addition to the analysts, if desired.

The method of the invention is applicable to a wide variety of applications including those involving customization of any type of vehicle performance data. Accordingly, the method preferably is implemented as a computer program product having a computer readable storage medium for storing computer readable instructions for implementing the elements described above and, in particular, the customization element described above.

The computer readable instructions that are stored in the computer-readable storage medium, such as a memory device, can direct a computer or other programmable apparatus to function in a particular manner, such that the instructions stored in the computer-readable storage medium produce an article of manufacture including instruction which implement the various functions of the method described above. In this regard, the computer readable instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the method described above.

As described above, both for a general system 10 and the specific embodiment of system 10 illustrated in FIG. 5, the system 10 and associated methods permit users to select options based upon their preferences regarding how and when vehicle performance data is presented to them. For example, each user may select which types of data to be immediately alerted to, how to prioritize the data, and how to deliver the data to the user, if at all. Thus, each user may select the options provided by system 10 to automatically implement the requirements for their particular maintenance plan for their vehicles instead of having to physically analyze the data while keeping in mind their particular maintenance plan.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A monitoring system for a vehicle comprising a plurality of components, wherein the monitoring system comprises:

a data gathering element capable of receiving data associated with operation of the vehicle and indicative of an occurrence of at least one event;

a processing element for determining, prior to a vehicle failure, a probability of vehicle failure based upon the prior occurrence of an event as indicated by the data received by said data gathering element and further based upon a passage of time following the occurrence of the event, wherein the probability of vehicle failure determined by said processing element increases over time following the occurrence of the event;

a customization element for applying at least one user preference to the data, wherein the at least one user preference comprises prioritization preferences including directions to prioritize the data based upon historical data related to at least one of the vehicle and a type of the vehicle, and wherein said customization element is capable of applying alerting preferences, which include directions to alert the user beginning some time after the occurrence of an event when said processing element has determined that the probability of vehicle failure has increased over time after the occurrence of the event to at least a predetermined value; and a display element for presenting at least a portion of the data received by said data gathering element after said customization element applies the at least one user preference to the data.

2. The monitoring system according to claim 1, wherein said data gathering element is capable of receiving at least one of fault data and prognostic data associated with operation of the vehicle.

3. The monitoring system according to claim 1, wherein said data gathering element is located in the vehicle, and said customization element is located outside the vehicle, and further comprising a communication link between said data gathering element and said customization element for transmitting data between said data gathering element and said customization element.

4. The monitoring system according to claim 1, wherein said data gathering element comprises said customization element.

5. The monitoring system according to claim 1, wherein said data gathering element is located outside of the vehicle, and further comprising a communication link between the vehicle and said data gathering element for transmitting data between the vehicle and said data gathering element.

6. The monitoring system according to claim 1, wherein said data gathering element is capable of integrating the data received from the vehicle with other data associated with at least one of a design of the vehicle, a maintenance history of the vehicle, a maintenance supply list for the vehicle, and an aggregate performance of the type of vehicle, and wherein said display element is capable of receiving and displaying the integrated data.

7. The monitoring system according to claim 1, wherein the data comprises events associated with operation of the vehicle, and wherein said customization element is capable of applying alerting preferences, which include directions to alert the user once the data indicates that a maximum number of events have occurred.

8. The monitoring system according to claim 1, wherein the data comprises events associated with operation of the vehicle, and wherein said customization element is capable of applying prioritization preferences, which include directions to prioritize the data based upon a probability of vehicle failure after the occurrence of an event, and wherein data associated with a higher probability of vehicle failure has a higher priority than data associated with a lower probability of vehicle failure.

9. The monitoring system according to claim 8, wherein said customization element is capable of applying prioritization preferences, which include directions to display the data via said display element based upon the priority of the data.

10. The monitoring system according to claim 8, wherein said customization element is capable of applying data delivery preferences, which include directions to immediately deliver the data to the user when the probability of vehicle failure after the occurrence of an event in the data is at least a predetermined value.

11. The monitoring system according to claim 1, wherein said display element comprises at least one of a pager, an electronic mail display device, and a terminal, and wherein said customization element is capable of applying data delivery preferences, which include directions to deliver data to the user via at least one of the pager, an electronic email display device, and a terminal.

12. The monitoring system according to claim 1 wherein the alerting preferences applied by said customization element include directions to alert the user when said processing element determines that the probability of vehicle failure has reached the predetermined value.

13. The monitoring system according to claim 1 wherein said processing element determines the probability of vehicle failure at different times following receipt of the data by said data gathering element.

14. A method for monitoring a vehicle comprising a plurality of components, wherein the method comprises:

receiving data associated with operation of the vehicle and indicative of an occurrence of at least one event;

determining, prior to a vehicle failure, a probability of vehicle failure based upon the prior occurrence of an event as indicated by the received data and further based upon a passage of time following the occurrence of the event, wherein the probability of vehicle failure that is determined increases over time following the occurrence of the event;

applying at least one user preference to the data that has been received by applying at least one prioritization preference governing prioritizing the data based upon historical data related to at least one of the vehicle and a type of the vehicle, wherein applying at least one user preference comprises applying alerting preferences that provide directions to alert the user beginning some time after the occurrence of an event when the probability of vehicle failure is determined to have increased over time after the occurrence of the event to at least a predetermined value; and presenting at least a portion of the data after applying the at least one user preference to the data.

15. The method for monitoring a vehicle according to claim 14, wherein said receiving data comprises receiving at least one of fault data and prognostic data associated with operation of the vehicle.

16. The method for monitoring a vehicle according to claim 14, further comprising integrating the data regarding the operation of the vehicle with other data associated with at least one of a design of the vehicle, a maintenance history of the vehicle, a maintenance supply list for the vehicle, and an aggregate performance for the type of vehicle, and wherein presenting at least a portion of the data comprises presenting at least a portion of the integrated data.

17. The method for monitoring a vehicle according to claim 14, wherein presenting at least a portion of the data comprises displaying at least a portion of the data via a display element.

18. The method for monitoring a vehicle according to claim 14, wherein the data comprises events associated with operation of the vehicle, and wherein applying at least one user preference comprises applying alerting preferences so as to alert the user once a maximum number of events occur in the data.

19. The method for monitoring a vehicle according to claim 14, wherein the data comprises events associated with operation of the vehicle, and wherein applying at least one user preference comprises applying prioritization preferences based upon a probability of vehicle failure after the occurrence of an event, wherein data associated with a higher probability of vehicle failure has a higher priority than data associated with a lower probability of vehicle failure.

20. The method for monitoring a vehicle according to claim 19, wherein applying at least one user preference comprises applying prioritization preferences that provide directions for presenting the data based upon the priority of the data.

21. The method for monitoring a vehicle according to claim 19, wherein applying at least one user preference comprises applying data delivery preferences that provide directions to immediately deliver the data to the user when the probability of vehicle failure after the occurrence of an event in the data is at least a predetermined value.

22. The method for monitoring a vehicle according to claim 14, wherein presenting at least a portion of the data comprises transmitting the data to at least one of a pager, an electronic mail display device, and a terminal, for display thereon, and wherein applying at least one user preference comprises applying data delivery preferences that provide directions to deliver data to the user via at least one of the pager, the electronic email display device, and the terminal.

23. The method according to claim 14 wherein applying the alerting preferences comprises applying alerting preferences that include directions to alert the user when the probability of vehicle failure is determined to have reached the predetermined value.

24. The method according to claim 14 wherein determining the probability comprises determining the probability of vehicle failure at different times following receipt of the data.

25. A system for reporting vehicle monitoring data, comprising:

a data gathering element capable of receiving data representative of events associated with operation of a vehicle and indicative of an occurrence of at least one event;

a processing element capable of consolidating the gathered data and determining, prior to vehicle failure, a probability of failure of the vehicle based upon the prior occurrence of an event as indicated by the data received by said data gathering element and further based upon a passage of time following the occurrence of the event, wherein the probability of vehicle failure determined by said processing element increases over time following the occurrence of the event; and a customization element capable of receiving and applying at least one user preference that provides directions to alert the user regarding the data at the time when said processing element has determined that the probability of failure of the vehicle for the event associated with the data has increased over time after the occurrence of the event to at least a predetermined value.

26. The system according to claim 25, further comprising a storage element capable of storing at least one predetermined value representing at least one probability of failure of the vehicle for at least one event.

27. The system according to claim 25, further comprising a display element for displaying at least the data associated with events that cause the predetermined value to at least be met by the probability of failure of the vehicle.

28. The system according to claim 27, wherein said display element comprises at least one of a pager, an electronic email display device, and a terminal, and wherein said customization element is capable of applying delivery preferences, which include directions to deliver data to the user via at least one of the pager, the electronic email display device, and the terminal.

29. The system according to claim 25, wherein said customization element is also capable of assigning a user-defined status to data associated with an event based upon the probability of failure of the vehicle for the event.

30. The system according to claim 25, wherein said data gathering element is capable of receiving at least one of fault data and prognostic data associated with operation of the vehicle.

31. The system according to claim 25, wherein said data gathering element is located in the vehicle, and said customization element is located outside the vehicle, and further comprising a communication link between said data gathering element and said customization element for transmitting data between said data gathering element and said customization element.

32. The system according to claim 25, wherein said data gathering element comprises said customization element.

33. The system according to claim 25, wherein said data gathering element is located outside the vehicle, and further comprising a communication link between the vehicle and said data gathering element for transmitting data between the vehicle and said data gathering element.

34. The system according to claim 25 wherein the at least one user preference applied by said customization element includes directions to alert the user when said processing element determines that the probability of vehicle failure has reached the predetermined value.

35. The system according to claim 25 wherein said processing element determines the probability of vehicle failure at different times following receipt of the data by said data gathering element.

36. A method for reporting vehicle monitoring data, comprising:

receiving data comprising events associated with operation of a vehicle and indicative of an occurrence of at least one event;

consolidating the data and determining, prior to a vehicle failure, a probability of failure of the vehicle based upon the prior occurrence of an event as indicated by the received data and further based upon a passage of time following the occurrence of the event, wherein the probability of vehicle failure that is determined increases over time following the occurrence of the event; and applying at least one user preference that provide directions to alert the user regarding the data at the time when the probability of failure of the vehicle for the event associated with the data is determined to have increased over time after the occurrence of the event to at least a predetermined value.

37. The method according to claim 36, further comprising storing at least one predetermined value representing at least one probability of failure of the vehicle for at least one event.

38. The method according to claim 36, further comprising displaying at least the data associated with events that cause the predetermined value to at least be met by the probability of failure of the vehicle.

39. The method according to claim 38, wherein displaying comprises transmitting the data to at least one of a pager, an electronic email display device, and a terminal, and wherein applying at least one user preference comprises applying delivery preferences, which include directions to deliver data to the user via at least one of the pager, the electronic email display device, and the terminal.

40. The method according to claim 38, wherein consolidating the data comprises integrating the data regarding the operation of the vehicle with other data associated with at least one of a design of the vehicle, a maintenance history of the vehicle, a maintenance supply list for the vehicle, and an aggregate performance for the type of vehicle, and wherein displaying the data comprises displaying at least a portion of the integrated data.

41. The method according to claim 36, wherein applying at least one user preference comprises assigning a user-defined status to data associated with an event based upon the probability of failure of the vehicle for the event.

42. The method according to claim 36, wherein receiving data comprises receiving at least one of fault data and prognostic data associated with operation of the vehicle.

43. The method according to claim 36 wherein applying the at least one user preference comprises applying at least one user preference that includes directions to alert the user when the probability of vehicle failure is determined to have reached the predetermined value.

44. The method according to claim 36 wherein determining the probability comprises determining the probability of vehicle failure at different times following receipt of the data.

* * * * *